C. B. REPP.
PHONOGRAPH.
APPLICATION FILED JUNE 24, 1909.
1,003,655.
Patented Sept. 19, 1911.
2 SHEETS—SHEET 1.
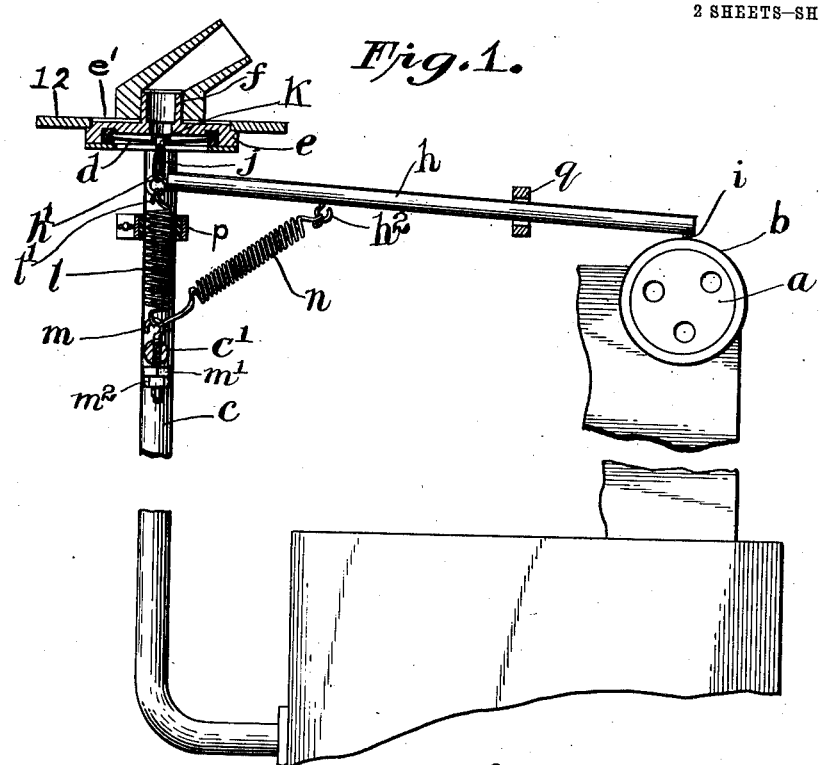
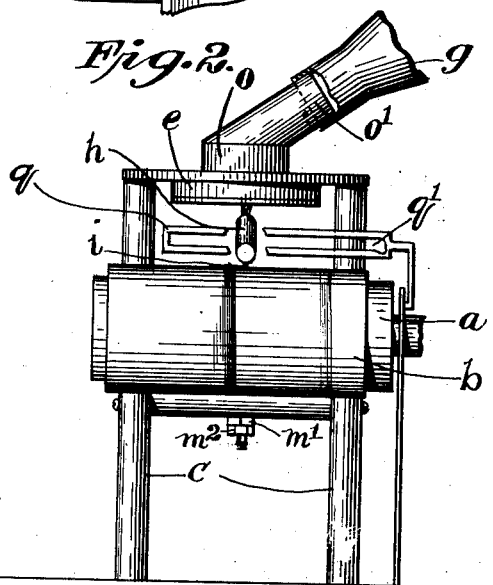
Attest:
B. S. Daniels
P. J. Wening
Inventor:
Clinton B. Repp
by Frank P. Wentworth
his Atty.

C. B. REPP.
PHONOGRAPH.
APPLICATION FILED JUNE 24, 1909.
1,003,655.
Patented Sept. 19, 1911.
2 SHEETS—SHEET 2.
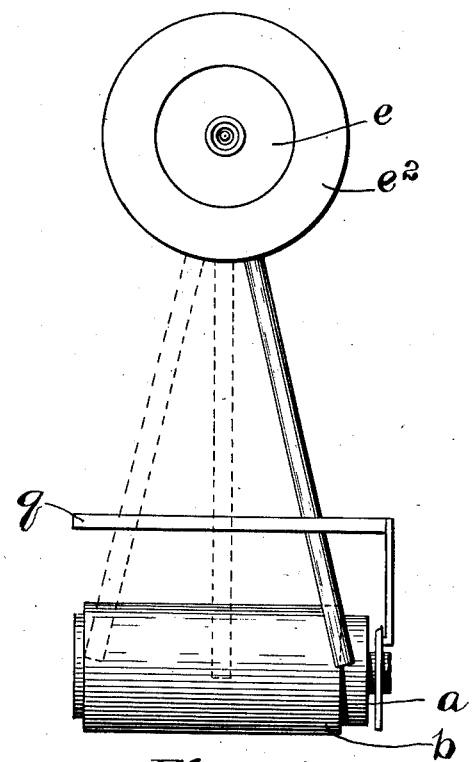
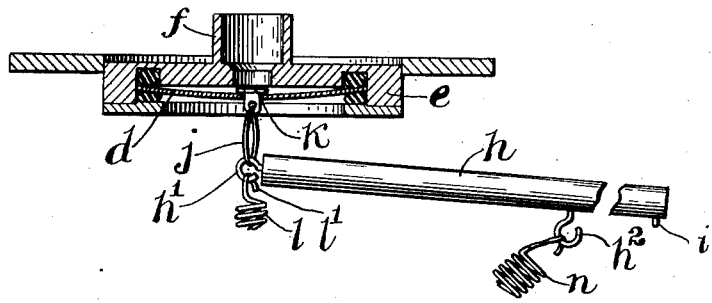

UNITED STATES PATENT OFFICE.

CLINTON B. REPP, OF NEW YORK, N. Y., ASSIGNOR, BY DIRECT AND MESNE ASSIGNMENTS, OF ONE-HALF TO WILLIAM E. COOK, OF ROXBURY, MASSACHUSETTS.

PHONOGRAPH.

1,003,655.  Specification of Letters Patent.  Patented Sept. 19, 1911.

Application filed June 24, 1909.  Serial No. 503,978.

*To all whom it may concern:*

Be it known that I, CLINTON B. REPP, a citizen of the United States, residing in the borough of Manhattan, in the city, county, and State of New York, have invented certain new and useful Improvements in Phonographs, of which the following is a specification, reference being had therein to the accompanying drawings, which form a part thereof.

My invention relates to phonographs, and more particularly to the mechanism relating to sound translation.

The main object of the invention is to provide a phonograph wherein the sound waves of the record will be accurately transmitted to, and reproduced by, a diaphragm with a large volume of resultant sound waves so modified as to have clearness of tone as well as accuracy of reproduction, all vibrations other than those due to the indentations upon the record being eliminated or lost during the transmission of the vibrations from the reproducer point to the diaphragm.

A further object is to provide a phonograph wherein any cross vibrations due to the movement of, or actuating mechanism for imparting movement to, the diaphragm and its sound box will be eliminated or avoided.

A still further object is to provide a phonograph wherein the diaphragm may be placed and maintained under a constant tension to insure such sensitiveness to vibrations thereof as will secure the interception of even minute vibrations with a resultant clear, and exact reproduction of the sound waves represented by the indentations upon the record, with every detail accentuated.

A still further object is to provide a phonograph wherein the diaphragm will be placed under a constant tension, and said tension may be varied or regulated to attune the diaphragm and the various parts of the instrument incidental to the transmission of the vibrations from and reproduction of the sound waves defined by the record.

A still further object is to provide a phonograph wherein the diaphragm and its sound box will be fixed relative to the record, and the reproducer point and the vibratory members interposed between the said point and the said diaphragm will be capable of such movement relative to the record as will permit the reproducer point to follow the spiral trend of the indentations of the record.

A still further object is to provide a phonograph wherein the diaphragm and its sound box will be fixed relative to the record, and the reproducer point will be propelled along the record through its engagement with the indentations therein, the vibrations set up by such engagement being transmitted to the diaphragm by interposed vibratory members the first of which carries said reproducer point and has a swiveling relation to the diaphragm.

A still further object is to provide a phonograph wherein the pressure of the reproducer point will be entirely independent of the means tensioning the diaphragm.

A still further object is to provide a phonograph wherein the various parts incidental to the tensioning of the diaphragm and the exertion of pressure of the reproducer point upon the record will be so constructed and arranged as not to divert or absorb vibrations of the vibratory members, or set up cross vibrations resulting in false tones in the sound reproduction due to the action of these vibrations upon the diaphragm.

A still further object is to provide a phonograph embodying therein a fixed diaphragm and a vibrator arm extending radially thereof, and capable of movement about the axis of said radius, wherein the movements of said arm will be positively defined to prevent a displacement of parts, or injury to the reproducer point through contact with metallic parts of the instrument.

A still further object is to provide a phonograph wherein the vibrations set up by the indentations in a record will be transmitted by the reproducer point to a rigid member capable of transmitting such vibrations to the diaphragm, said point being carried by and firmly attached to said member in a manner to cause all vibrations to be transmitted by the point to said member without likelihood of the loss of any sound waves, or the modification of the length of such vibrations. And a still further object is to provide a phonograph which may be inexpensively produced and which will reproduce sounds in great volume, and with accuracy.

The invention consists primarily in a phonograph embodying therein a diaphragm, means placing same under tension, a reproducer point and a vibratory member between said point and said diaphragm, whereby the vibrations resulting from the engagement of said point with indicated sound waves on a record will be transmitted from said point to said diaphragm through said vibrator member; and in such other novel features of construction and combination of parts as are hereinafter set forth and described and more particularly pointed out in the claims hereto appended.

Referring to the drawings:—Figure 1 is a side elevation of a phonograph embodying my invention, the diaphragm and its sound box being shown in vertical section; Fig. 2 is a front view thereof; Fig. 3 is a plan view thereof, and Fig. 4 is an enlarged sectional detail view of the diaphragm, sound box, interposed vibrator member and reproducer point.

Like letters refer to like parts throughout the several views.

In the accompanying drawings, I have not shown and I will not describe in detail, the mechanism rotating the record, it being apparent that any record actuating means may be employed, this invention having to do with the transmission of the vibrations necessary to reproduce through the diaphragm, those waves recorded upon the wax or other cylinder.

In the drawings, the support for the record is shown as an ordinary mandrel $a$ which may be rotated about a horizontal axis by means of any desired mechanism. The record shown at $b$ is of the ordinary cylinder type.

Off-set relative to the axis of the mandrel $a$ and cylinder $b$, is a supporting frame $c$ for the diaphragm $d$ and its sound box $e$. The construction and arrangement of the sound box $e$ may be the same as now ordinarily used, differing therefrom, however, in the respect that the diaphragm does not carry the reproducer point. The center of the sound box is about midway between the ends of the mandrel $a$ and its contained record $b$, and is immovable relative thereto. The sound box $e$ has the ordinary sound opening and outlet $f$ adapted to receive the horn $g$. The manner of attachment of this horn, however, differs from that of the ordinary phonograph in that it may be turned completely around to any point without interfering with the connection between the horn and the outlet. A detailed description of this manner of mounting the horn will be more fully entered into hereinafter.

The sound box being distant from the record, it is apparent that some means for transmitting the vibrations indicated on the record must be provided, which means will have the two-fold function of carrying the vibrations and following the record, or the indentations thereon which have a spiral trend. The essentials of this interposed vibratory transmitting mechanism are susceptibility of responding readily to the vibrations produced by the sound record without absorbing such vibrations, and adaptability of movement circumferentially of the diaphragm without interrupting such vibrations. This mechanism embodies therein a vibrator arm $h$ the outer end of which carries the reproducer point $i$ which point is firmly secured to and in intimate contact with said arm so as to transmit the vibrations thereto, either by being firmly embedded therein alone, or by means of a metallic mounting, and the inner end of said arm is mounted relative to the center of the diaphragm $d$ in a manner to transmit the vibrations from said arm to said diaphragm, the connection being such as to permit a swiveling or rotary movement of said arm circumferentially of said diaphragm. The arm $h$ may be made of any desired material taking any desired form although by experiment I have demonstrated satisfactorily that a soft, close-grained wood, such as bass wood, or American linden, results in not only an exact reproduction of the sound vibrations through the absence of cross-tones or blasts, but modulates these tones so as to result in a softness or sweetness in the reproduced tones without diminishing their volume. Preferably the connection between the inner end of the arm $h$ is by means of a strand $j$ of waxed thread secured to a headed stud $k$, the head of which bears upon the diaphragm $d$ and the stem of which has an opening therein through which the strand $j$ is looped. It will be observed that this strand is flexible, thus permitting the arm $h$ to turn readily through that arc necessary to bring it into engagement with all parts of the record $b$. The twisting of the strand $j$ while impairing the transmission of the vibrations to a certain extent, does not otherwise effect the mode of operation of the device.

To permit the transmission of the vibrations of the arm $h$ to the diaphragm $d$ through the strand $j$ it is necessary to tauten this strand, which tautening also accomplishes the tensioning of the diaphragm itself in a manner to make it extremely sensitive. The agency employed for accomplishing this tautening of the strand and tensioning of the diaphragm must be so arranged as not to interfere with the free swiveling movement of the arm $h$. Preferably this means consists of a coiled spring $l$ one end of which is formed into an open loop or hook which is passed through a loop or hook $h'$, which is the connecting means or agency between the arm $h$ and the strand $j$. The other end of this spring is secured to a hook or loop $m$ mounted in a cross-head $c'$ of the frame $c$, the said cross-head $c'$ being directly below the center of the diaphragm $d$.

The tension of the diaphragm $d$ will be controlled by the tension of the spring $l$, and as the sound reproduction may be controlled through the tension of said diaphragm, I preferably provide means for varying the tension of the said diaphragm through a variance in the tension of the spring $l$. This adjustment is accomplished by making the shank of the hook or loop $m$ screw-threaded and passing it through an opening in the cross-head $c'$, the nut $m'$ and lock nut $m^2$ being used for drawing said hook or loop toward the cross-head to increase the tension of the spring $l$ or permit the tension of the spring $l$ to draw said loop toward the diaphragm, and locking said hook or loop in the adjusted position. The open hook $l'$ at the top of the spring $l$ is for the purpose of preventing the deadening of the vibrations or the formation of cross-vibration at the point of connection between said spring and said arm. The hook or loop $h'$ is made large in order to provide that clearance necessary to permit the hook to turn freely, relative to both the strand $j$, or hook or loop $l'$.

If desired, other connecting means between the arm $h$ and the diaphragm $d$, and other means tensioning the diaphragm may be employed without departing from the spirit and scope of the invention.

In order to cause the outer end of the arm $h$ and the reproducer point carried thereby to exert the required pressure upon the record $b$, means exerting a downward pressure upon said arm must be employed. To avoid the necessity for always having the phonograph upon a level, this means preferably consists of a coiled spring $n$, the opposite ends of which respectively are formed into hooks and attached to the open hook or loop $m$, and a hook $h^2$ upon the arm $h$ adjacent to the inner end thereof. The connections between the spring $n$ and the hooks or loops $m$ $h^2$ respectively must be such as to permit the swiveling movement of these parts relative to each other, which may be accomplished in the simplest form by means of looped connections having such clearance as will avoid a tight fit and a consequent binding at this point.

It will be observed that the spring $l$ is attached to the same lower center as the hook $n$, thus causing the axis of rotation of the arm $h$ and its pressure spring to be the same.

The top of the sound box $e$ is provided with a circular recess $e'$ having an outer flange $l^2$ in which recess $e'$ is mounted a fitting $o$ having an enlarged base and an angularly projecting tube $o'$ adapted to carry the horn. The opening in the base of the fitting $o$ has a close sliding fit to the casing forming the sound opening $f$, the said fitting being attached to the sound box by means of this fit so that the horn may be turned in any direction being capable of describing a complete circle about the sound outlet or opening $f$.

To prevent as much as possible the vibrations of the spring $l$ with resultant cross-tones or blasts, from the diaphragm, I use a muffler upon said spring consisting of a flange $p$ having a resilient lining such as soft rubber, in contact with said spring, without exerting sufficient pressure thereon to effect the tension of the spring. This muffler is not essential to the operation of the device, but may be used to secure the highest efficiency by the elimination of all vibrations upon the diaphragm other than those passing through the vibrator arm $h$.

To place limitations upon the movement of the arm $h$ both its rotary movement and its vertical movement in order to prevent accidental injury to the reproducer point by engagement with the mandrel $a$ or other parts of the phonograph other than the record $b$, I provide a guide $q$ composed of a frame adjacent to the outer end of the said arm $h$ which frame has a slot therein through which the said arm passes. This slot is of a width so as to be free of the arm $h$ when said arm is in operative engagement with the record $b$, allowing additional clearance above said arm to permit the reproducer point to be raised out of engagement with the record and brought to the starting point. The clearance below said arm is merely enough to prevent the engagement of the arm therewith when the reproducer point is in engagement with the record, thus causing the lower edge of said slot to support the arm at other times. Beyond the starting point of the record, I form a recess $q'$ in said support in order to retain the arm at this point. The frame $q$ may be made of any desired material inasmuch as it has no function in the reproduction of sound, being merely a safety device for preventing injury to the reproducer point. It is arranged adjacent to the mandrel in order to reduce the leverage in shifting the arm which might result in injury to the diaphragm.

The operation of the herein described phonograph is substantially as follows:—
The record $b$ being placed upon the mandrel $a$ and the mechanism rotating said mandrel and record being set in motion, the reproducer point $i$ is placed upon the right hand side of the record as shown in Fig. 2, in engagement with the first of the indentations in said record. As the record rotates, the indentations or indicated sound waves thereon will set up vibrations in said point $i$ which vibrations will be transmitted to the arm $h$ along which they will pass to the inner end thereof, where they will be transmitted through the strand $j$ to the diaphragm $d$, the vibrations of which diaphragm will in the usual manner produce sound waves coinciding with those indicated upon the record $b$. The point $i$ being firmly mounted upon and in intimate contact with the arm $h$, no cross vibrations will be caused by the movement of said point, and inasmuch as the arm $h$ is free from end to end from contact with any rigid matter, the vibrations will be uninterrupted and will be modified only by the material of this arm which will aid to modulate same in a manner to cause a rich, round, full reproduction of the sound waves by the diaphragm. The spring $n$ will cause the point to exert sufficient pressure upon the record to insure a responsive vibration to even the most minute variance in the wave indication, thus insuring accuracy in the slightest detail in the reproduction of sound from the record. The tensioning of the diaphragm $d$ will make this diaphragm extremely sensitive and cause it to pick up and respond to every slight vibration transmitted through the arm $h$, thus carrying the accuracy and detail of the reproduction throughout the entire machine. The sharpness of the tone reproduced by the diaphragm $d$ may be governed by the tension placed upon said diaphragm as by increasing said tension, I have found that the volume of the tone in increased, as well as its intensity, up to a certain point beyond which it increases merely in intensity. The use of a strand $j$ made of waxed cord produces the sweetest tones as, the elasticity of gut serves to deaden the tones somewhat, and the use of metal, to impart a metallic characteristic to the sound reproduction. The direction of the pressures exerted by the springs $l$ $n$ causes a substantially axial pull upon the diaphragm and causes the arm $h$ to rotate while traversing the record about an axis in alinement with the axis of the diaphragm or substantially so, according to the pressure exerted by the spring $n$.

The reproducer point on the arm $h$ being in constant engagement with the indentations on the record, and all the strains on said arm being concentrated in the axis of rotation of said arm, the outer end of said arm is free to rotate or move laterally under the control of the said indentations which have a spiral trend so as to impart this movement.

It will be observed that the sound box being stationary, is not subject to any vibrations whatever, excepting those transmitted to the diaphragm therein contained through the vibrator mechanism interposed between this diaphragm and the reproducer point and that thus the likelihood of external influence upon the diaphragm to create false vibrations thereof is reduced to a minimum. In fact the reproduced tones from my phonograph as herein described are entirely free from that scratching and those false blasts commonly found in phonographs, the elimination of which is one purpose of the invention.

The outer end of the arm $h$ in following the record describes an arc as indicated in Fig. 3 of the drawings, but the fact that the reproducer point departs from the same radius throughout the record is immaterial, inasmuch as its engagement with the indentations is continuous and the reproducer point alone projects into said indentations and the outer end of the arm $h$ does not contact at any time with the record.

The operation of the adjustment mechanism is apparent, its function being solely to control the pressure exerted upon the diaphragm to place it in tension so as to secure the best quality of sound reproduction and eliminate any variance in the tension which might be due to the inequality of different springs in different machines.

The guide $q$ as heretofore stated, has no function in the reproduction of sound having no operative engagement with the arm $h$ while it, said arm, is connected with the record. It is designed merely to prevent a careless operator from injuring the reproducer point or disturbing the adjustment of the machine.

The various connections between the springs, the arm $h$, the strand $j$, and the cross-head $c'$ are made large in order to secure the desired swiveling action without loosely connected parts.

By placing a muffler upon the spring $l$ any vibrations which might otherwise be transmitted through said spring will be cut off, thus causing all vibrations to be concentrated within the diaphragm and these vibrations to be confined strictly to those of the vibrator mechanism interposed between the diaphragm and the reproducer point.

By the use of a close, straight-grain wood, I avoid blasts due to the material of the wood, and any cross vibrations therein, and thus cause such regular uninterrupted vibrations of the diaphragm $d$ itself as to secure a fine tone to the reproduced sounds.

The construction and arrangement of the fitting $o$ not only directs the reproduced sound waves to the trumpet, but avoids loose parts at this point, while permitting the tones to be directed to any point about the sound opening or outlet $f$.

It is not my intention to limit the invention to the precise details of construction, shown in the drawings, it being apparent that my invention may be modified to adapt it to any type of phonograph. I believe it to be broadly new to provide a sound box and its contained diaphragm having no movement whatever relative to the record and to transmit the sound waves to the record, by means of a vibrator carrying a reproducer point adapted to engage the record and extended to and connected with the diaphragm in a manner to permit said vibrator member to traverse the record automatically, and I intend to claim such broadly. I also believe it to be new to provide a diaphragm which is under tension aside from that being produced in setting the diaphragm in the sound box, and the action thereon of the reproducer point and I also intend to claim such broadly.

Having described the invention, what I claim as new and desire to have protected by Letters Patent, is:—

1. In a phonograph, an amplifier, a flexible member attached thereto, means exerting a pressure upon said amplifier through said flexible member, whereby said amplifier is placed under constant direct tension, and a vibrator member carrying a reproducing member attached to said flexible member.

2. In a phonograph, a diaphragm, means exerting a pressure on said diaphragm whereby said diaphragm is placed under constant and direct tension and means transmitting sound vibrations to said diaphragm, said tensioning pressure being applied to said diaphragm in a direction opposite to the direction of movement of said sound vibrations in passing to said diaphragm.

3. In a phonograph, a diaphragm, means exerting a pressure centrally of said diaphragm, whereby said diaphragm is placed under constant and direct tension and means transmitting sound vibrations to said diaphragm, said tensioning pressure being applied to said diaphragm in a direction opposite to the direction of movement of said sound vibrations in passing to said diaphragm.

4. In a phonograph, a diaphragm, means exerting a pressure on said diaphragm whereby it is placed under constant direct tension, a reproducer point, and vibrator means extending from said point to said diaphragm whereby the sound vibrations resulting from the engagement of said point with indicated sound waves on a record will be transmitted from said point to said diaphragm through said vibrator means, said tensioning pressure being applied to said diaphragm in a direction opposite to the direction of movement of said sound vibrations in passing to said diaphragm.

5. In a phonograph, a record support, means rotating the same, a sound box fixed relatively to said support and spaced away therefrom, a horizontally disposed diaphragm in said box, a vibrator member carrying a point adapted to engage and track in the indicated sound waves of a record, and extending in a direct line from said reproducer point to a point below said diaphragm, means forming a swivel connection between the end of said vibrator member and said diaphragm and means disposed out of the range of vibrations passing to said diaphragm, whereby said diaphragm and said connecting means are placed under tension.

6. In a phonograph, a diaphragm, a flexible member carried thereby and adapted to transmit vibrations thereto, means exerting a pressure upon said diaphragm through said member, whereby said diaphragm is placed under constant direct tension, a reproducer point, and a vibrator member between said point and said flexible member, whereby the vibrations resulting from the engagement of the said point with indicated sound waves on a record will be transmitted from said point to said diaphragm through said vibrator member and said flexible member.

7. In a phonograph, a diaphragm, a flexible member carried thereby and adapted to transmit vibrations thereto, means exerting a pressure upon said diaphragm through said member, whereby said diaphragm is placed under constant direct tension, a reproducer point, a vibrator member between said point and said flexible member, whereby the vibrations resulting from the engagement of the said point with indicated sound waves on a record will be transmitted from said point to said diaphragm through said vibrator member and said flexible member, and means causing said point to press upon said record.

8. In a phonograph, a diaphragm, a flexible member carried centrally thereof and adapted to transmit vibrations thereto, means tensioning said member, a reproducer point, a vibrator member between said point and in contact with said flexible member whereby the vibrations resulting from the engagement of the said point with the indicated sound waves on a record will be transmitted from said point to said diaphragm through said vibrator member and said flexible member, and an elastic member having one end secured to said vibrator member and the other end secured directly opposite said flexible member whereby said flexible member and said elastic member will have movement about a common axis.

9. In a phonograph, a diaphragm, a flexible member carried thereby and adapted to transmit vibrations thereto, a reproducer point, a vibrator member between said point and said flexible member whereby the vibrations resulting from the engagement of the said point with indicated sound waves on a record will be transmitted from said point to said diaphragm through said vibrator member and said flexible member, and elastic members extending from a fixed point directly opposite said flexible member to said flexible member and to said vibrator member respectively, whereby said diaphragm will be tensioned, and said vibrator member will press said point upon said record, and said arm and said elastic members may rotate about a common axis.

10. In a phonograph, an amplifier, a flexible member attached thereto, means exerting a pressure upon said amplifier through said flexible member whereby said amplifier is placed under constant direct tension, means whereby the tension of said amplifier may be varied, and a vibrator member carrying a reproducer member attached to said flexible member.

11. In a phonograph, a diaphragm, means exerting a pressure on said diaphragm, whereby said diaphragm is placed under constant direct tension, means varying said pressure to regulate said tension, and means transmitting sound vibrations to said diaphragm, said tensioning pressure being applied to said diaphragm in a direction opposite to the direction of movement of sound vibrations in passing to said diaphragm.

12. In a phonograph, a diaphragm, means exerting a pressure centrally of said diaphragm whereby said diaphragm is placed under constant direct tension, means varying said pressure to regulate said tension, and means transmitting sound vibrations to said diaphragm, said tensioning pressure being applied to said diaphragm in a direction opposite to the direction of movement of sound vibrations in passing to said diaphragm.

13. In a phonograph, a diaphragm, an elastic tensioning member acting centrally of said diaphragm, whereby said diaphragm is placed under constant direct tension, means varying the tension of said elastic member to vary the tension of said diaphragm, and means transmitting vibrations to said diaphragm, said tensioning means being applied in a direction opposite to the direction of movement of sound vibrations in passing to said diaphragm.

14. In a phonograph, a diaphragm, an elastic tensioning member acting centrally of said diaphragm, whereby said diaphragm is placed under tension, means varying the tension of said elastic member to vary the tension of said diaphragm, means transmitting vibrations to said diaphragm, said tensioning means being applied in a direction opposite to the direction of movement of sound vibrations in passing to said diaphragm, and means preventing vibrations in said tensioning member.

15. In a phonograph, a diaphragm, a flexible member carried thereby and adapted to transmit vibrations thereto, a spring acting through said flexible member to tension said diaphragm, a damper acting upon said spring, and means transmitting vibrations to said diaphragm through said flexible member.

16. In a phonograph, a diaphragm, a headed stud passing through said diaphragm with the head engaging same, a flexible looped cord suspended from said stud, a reproducer point, a vibrator member, the opposite ends of which respectively carry said point and are adapted to be attached to said cord, whereby the vibrations resulting from the engagement of said point with indicated sound waves on a record will be transmitted from said point to said diaphragm through said vibrator member and said cord, means carried by said arm whereby it may be attached to said cord, a spring secured to the attachment means between said arm and said cord, and acting axially of the center of said diaphragm and means causing said point to press upon said record.

17. In a phonograph, the combination of a mandrel, and means rotating same, of a sound box fixed relatively to said mandrel and at a point substantially tangential thereto, and substantially midway between the ends thereof, a vibrator member having a swiveling relation to said sound box and its diaphragm, and carrying a reproducer point adapted to engage the indentations in a cylindrical record whereby said vibrator member will move longitudinally of said cylindrical record through its engagement with the indentations thereon, elastic means forcing said reproducer point into engagement with the record and elastic means below the swivel connection exerting a constant direct pressure upon the diaphragm in said sound box.

18. In a phonograph, a fixed sound box, a diaphragm therein, a vibrator member one end of which is attached to said diaphragm by a swivel connection, and the other end of which is provided with a reproducer point whereby intermediate pivotal connections on said member are avoided, means intermediate the ends of said member whereby said reproducer point is forced into intimate relation with the record and elastic means acting at the other end of said member whereby said diaphragm is placed under constant direct tension, and the oscillations of said member will be about an axis at the end thereof adjacent to the diaphragm.

19. In a phonograph, a diaphragm, a member attached thereto, means exerting pressure upon said diaphragm through said member, whereby said diaphragm is placed under constant direct tension, and a vibrator member, one end of which carries a reproducing member and the other end of which is engaged with said first named member.

20. In a phonograph, a diaphragm, a member attached thereto, a vibrator member one end of which loosely engages said member and the other end of which carries a reproducing member, and means exerting constantly uniform pressure upon said vibrator member whereby said diaphragm is tensioned through said vibrator member and said first named member.

In witness whereof I have hereunto affixed my signature, this 23d day of June, 1909, in the presence of two witnesses.

CLINTON B. REPP.

Witnesses:
  F. T. WENTWORTH,
  P. FRANK SONNEK.